TAPE TRANSPORT MEANS HAVING VARIABLE SPEED SUPPLY AND TAKE-UP REELS

Filed Aug. 30, 1963 4 Sheets-Sheet 1

*INVENTORS*
MALCOLM F. THOMPSON
FREDERIC F. GRANT
*BY*
ATTORNEY

INVENTORS
MALCOLM F. THOMPSON
FREDERIC F. GRANT
BY
ATTORNEY

INVENTORS
MALCOLM F. THOMPSON
FREDERIC F. GRANT
BY
[signature]
ATTORNEY

May 14, 1968 M. F. THOMPSON ETAL 3,383,061
TAPE TRANSPORT MEANS HAVING VARIABLE
SPEED SUPPLY AND TAKE-UP REELS
Filed Aug. 30, 1963 4 Sheets-Sheet 4

INVENTORS
MALCOLM F. THOMPSON
FREDERIC F. GRANT
BY [signature]
ATTORNEY

United States Patent Office 3,383,061

Patented May 14, 1968

3,383,061

TAPE TRANSPORT MEANS HAVING VARIABLE SPEED SUPPLY AND TAKE-UP REELS

Malcolm F. Thompson, 1602 Indus St., Santa Ana, Calif. 92707, and Frederic F. Grant, 14505 Eastbrook Ave., Bellflower, Calif. 90706

Filed Aug. 30, 1963, Ser. No. 305,878
3 Claims. (Cl. 242—55.13)

ABSTRACT OF THE DISCLOSURE

A tape transport mechanism including a gearing mechanism for causing rotation of the supply and take-up reels at different rates in the same direction during recording and playback of data.

This application contains, in part, subject matter disclosed in co-pending application Ser. No. 24,274, filed Apr. 25, 1960, now abandoned.

This invention relates to a tape transport mechanism, and particularly to an improved magazine type of tape holder and drive suited for airborne use.

The embodiment described provides a constant speed of tape travel over the magnetic heads, and quickly operable means for engaging and disengaging the magazine and the recording or playback equipment. The magazine is so constructed that the position of only one point is critical in manufacture, and the drive is obtained from a single motor in the equipment.

In assessing the value of events occurring during training flights or during an attack by airborne interceptors, it is very helpful to be able to record exactly what occurred for subsequent playback. For this purpose, an airborne signal data recorder is used in the airplane and a signal data reproducer is used on the ground. The significant data is recorded in the air on a data recording medium, which may be, for example, a magnetic tape carried in a removable magazine; this magazine is then removed and placed in the signal data reproducer on the ground for study. The recording is primarily accomplished in digital form with a binary coding format, which eliminates amplitude level errors and reduces the transient noise inherent in previously known types of recording.

The arrangement specified eliminates the cumbersome handling of bulk tape through the use of exchangeable tape magazines, which may be rapidly and simply installed and removed.

The present invention is concerned with the design and construction of the magazine assembly and the cooperating features of the airborne recorder and the ground playback or data processing and display units.

In the particular embodiment here contemplated, the recorder design permits simultaneous recording on a plurality of tracks, of 63 data signals, including 21 independent analog signals, 42 two-value inputs, or on-and-off signals, and one audio signal. The input circuitry will accept sinewave, squarewave, or D-C level signals, such as servo or resolver signals, where the carrier is suppressed and modulation takes place in a bandwidth of zero to 3 cycles per second. The two-value signals may have any true, or "on," value above +20 volts. The false, or "off" value is taken as zero volts. Thereafter, the input signals, except the on-off and audio, are put through a signal standardizing process in a signal adapter assembly to record within ±10 volts, and supplied to a multiplexing switch where each signal is sampled 15 times per second. The on-off signals are fed directly to the multiplexer from the input circuitry, and each is sampled 7.5 times per second.

Each sequentially sampled analog signal from the multiplexer switch is converted to a 7-bit binary coded digital signal by a digitizer assembly. Digital signals are recorded on 7 tracks of the tape, the on-off signals on the eighth tape track, and the timing signals and audio are applied to the ninth and tenth tracks, respectively.

The reproducer unit in which the magazine is placed on the ground may be housed in two cabinets, a reading or playback console and a display console. The playback console accepts the tape magazine from the airborne recorder, rewinds the tape, and reproduces the information recorded during flight. The digital data are sorted, stored in registers, and then translated into analog form within the range of −20 to +20 volts. The on-and-off signals are sorted and supplied to output terminals. The audio signals are replayed through a speaker in the console.

The recorded data are redisplayed on an indicator in another unit in the reproducer. The display console accepts outputs from the playback console, forming them into signals of the proper amplitude, impedance, and type (either direct-current or modulated carrier) required by the ground display equipment.

The reading equipment is thus able to duplicate or playback on its display console the information which had been available during the flight to the pilot in his aircraft.

In the airborne portion of the equipment, a tape drive assembly provides power through a capstan rotating at 133 r.p.m., and power take-off pulleys provide torque to drive the take-up and supply reels through slip clutches in their hubs.

While the invention has been described as embodied in equipment using magnetic tape as the recording medium, it will be obvious that other equivalent means for recording and reproducing data might be employed, such as magnetic wire, photographic tape, or other means which will be apparent to those skilled in the recording and reproducing arts.

There are three basic problems which must here be met: first, the tape must be transported at constant speed past the magnetic heads; second, there must be means for maintaining proper tape tension at the supply reel; and third, there must be means for maintaining proper tape tension at the takeup reel. The solution to these problems is facilitated by reducing the number of critical location points in manufacturing the magazine to a minimum. The number is here reduced to one.

In common with all recorders, the first of these problems must be satisfied if the recording is to present a true picture of the data which was received. Speed variations between the differenct parts of the tape transport mechanism will cause phase differences in the recording which can seriously interfere with or even destroy its value, and to prevent this, there must be separate means for controlling tape tension at the supply and takeup reels.

In a prior patent, No. 2,873,073, issued Feb. 10, 1959, and assigned to the assignee of the present inventors, J. P. Lekas disclosed a "Tape Recorder and Transcriber Drive System," for accomplishing the same general purposes as described. In that case, two separate motors were shown, one for driving coaxially-mounted supply and takeup reels, and the other for driving the capstan which accomplished the tape transport. The motors were axially displaced, and skewed relative to each other to permit the tape to feed over the capstan from the supply to the takeup reel. Proper tension on the tape at the supply and the takeup reels were maintained by one motor and its associated clutches, while the speed of transport past the recording and playback heads was under the control of the second motor, which drove the capstan.

The present invention represents an improvement on the equipment there disclosed, in that only a single motor is required, and the supply and takeup reels are mounted in co-planar positions so that the tape itself is not required to be skewed during its passage from one to the other.

In the tape transport mechanism hereafter described, the constant speed of tape travel past the recording heads is obtained by using a single synchronous alternating-current drive motor operating on three-phase, 400 cycles-per-second power from the aircraft electrical system. The motor is driven at constant speed, which is substantially 8,000 r.p.m. during the recording phase, and the equipment is designed for a rewind speed of substantially 23,000 r.p.m. In the particular embodiment, this means that the capstan which applies the driving power to the tape is rotating at 133 r.p.m. during the recording and playback phases. During the rewind phase, tape speed is not limited by differential tape tension, and the process may be completed in five and one-half minutes, whereas recording on a single magazine may be continued for one hour and 10 minutes. The system involves a plurality of spaced parallel, channels extending lengthwise of the tape, with 10 channels being recorded with a particular alinement transversely of the tape for half of the recording period. At the end of this period, the tape drive is reversed in direction and the second half of the information recorded in channels transversely displaced so as to be interlaced between those used for the first recording. This is easily accomplished by switching to a second set of recording heads which are so mounted as to provide the necessary channel displacement.

Each set of recording heads consists of 10 individual heads spaced transversely of the tape and separated by shielding strips to prevent interference between adjacent channels.

The tape drive motor is controlled by a relay energized by appropriate external signals, such as on-target signals from an aircraft radar system, audio signals from an aircraft communication system, or a manual on-off switch in the cockpit.

A metallic conducting strip at the end of the tape control actuates relays which accomplish the simultaneous operations of direction reversal and signal switching between heads, which take place when the tape has completed its first pass over the heads. The second pass is then accomplished with the use of the second set of recording heads, which are displaced transversely of the tape to effect the interlaced recording as described.

The objects of the invention thus include providing an improved system adapted for airborne recording and ground playback.

Another object is to provide tape storage and transport means which may be readily used with an airborne recorder and transferred to a playback and display mechanism on the ground.

A further object is to provide means for recording on a plurality of channels all the significant data required to reproduce the events occurring during airborne exercises.

A further object is to enable pilots and their instructors to study the events occurring during a training flight or an actual attack so that the techniques and operation may be improved for future use.

A still further object is to provide a compact, readily interchangeable tape magazine and drive mechanism in a form which will permit the rapid insertion and removal in airborne and ground-based equipment.

A still further object is to provide a tape transport mechanism which will eliminate previous difficulties in securing an accurate reproduction of data indicating occurrences during a flight.

A further object is to provide a form of magazine having only a single critical point to be located during manufacture.

These and other objects of the invention may be better understood by reference to the accompanying drawings in which.

Figure 2:
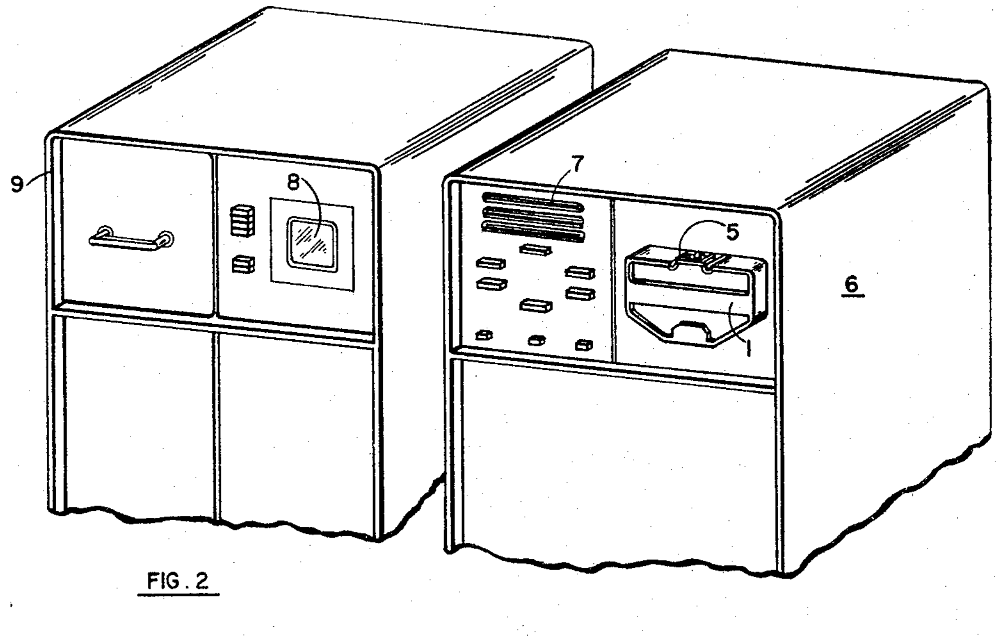
FIG. 2 is a perspective view of the tape magazine in position for playback and display of the recorded data on the ground, the ground consoles being shown fragmentarily.
Figure 1:
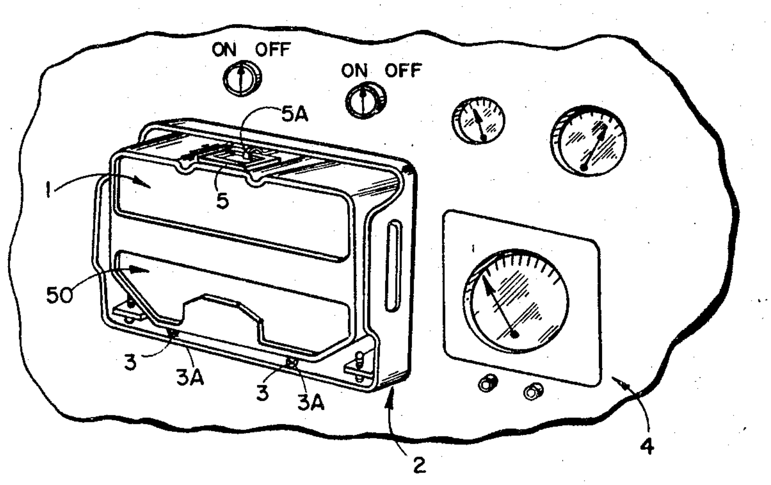
FIG. 1 is a perspective view of the tape magazine of the invention in place for airborne recording, with the portion of the instrument panel housing the recorder shown fragmentarily.

The tape magazine 1 is shown in perspective in FIG. 1 as it is used with an airborne recorder unit 2. The magazine 1 is removably mounted by positioning studs 3 and corresponding seats 3A in the recorder unit 2. The recorder unit 2 in turn is fixed in the instrument panel, shown fragmentarily at 4, of an airplane. The tape magazine 1 has a convenient folding carrying handle 5 which may be used to insert and lock the magazine in the recorder 2, or remove it therefrom for subsequent insertion in a playback console 6 on the ground.

The location of the positioning studs 3 and seats 3A determines the position of the axis of rotation of the capstan. This is the only critical relation in the magazine, and greatly simplifies manufacture over previously known arrangements, in which two or more additional elements, as motors, had to be precisely located. The proper alinement is maintained by the locking engagement of the folding handle 5 with a suitable catch 5A in the recorder unit or the playback console.

When reproducing the recorded signal data, the audio portion may be heard from a speaker 7 in the console 6, while the visual reproduction of the events during flight may be seen on the radar indicator panel 8 of an associated display console 9. The radar indicator panel 8, which includes a cathode tube, will show all of the data which were presented directly to the pilot during the recording period, so that as many aspects of the flight as possible may be considered. Other data recorded may also be suitably presented.

This permits monitoring possible faults which may have occurred during the flight, and enables the pilot to improve his techniques.

Figure 3:
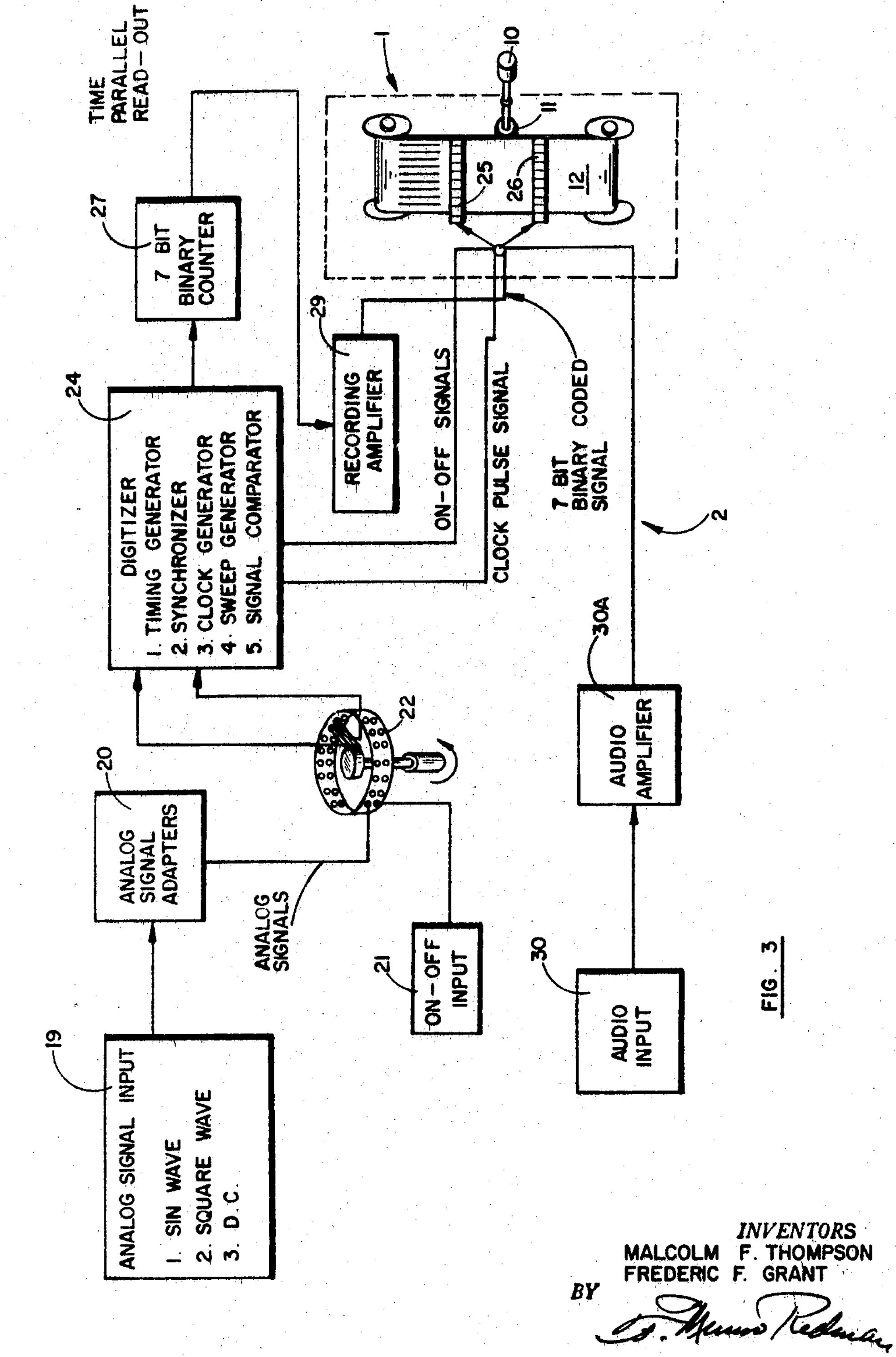
FIG. 3 is a schematic block diagram showing the elements utilized in an airborne magnetic tape recorder incorporating the instant invention.
Figure 4:
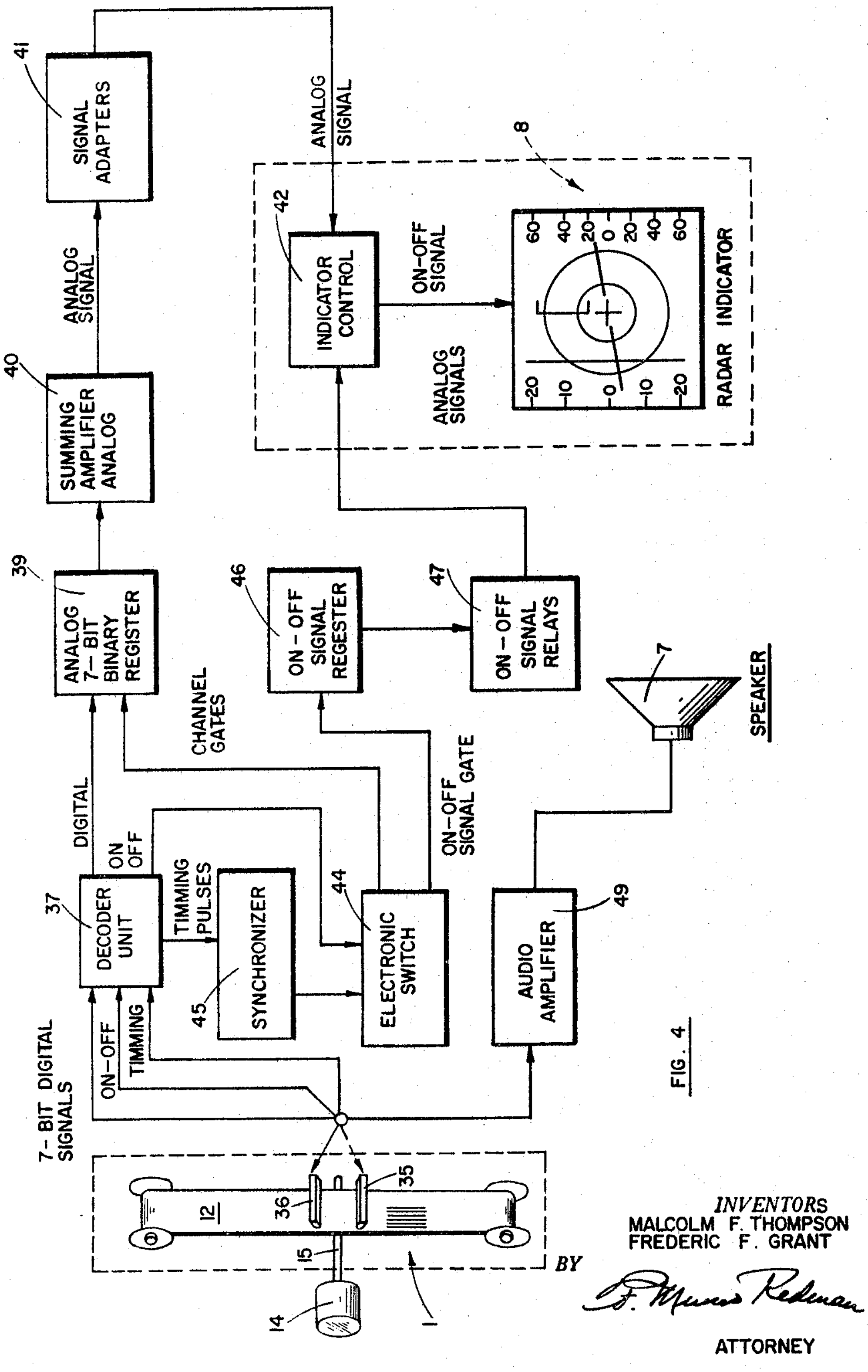
FIG. 4 is a schematic block diagram indicating the elements of the ground-based reproducing equipment cooperating with the tape drive mechanism of the present invention.

Within the airborne recording unit 2, and within the playback console 6, are mounted suitable motor means for transporting the tape enclosed by the magazine 1 past the magnetic heads in these assemblies. Recording motor 10, disposed in the airborne recorder unit 2, as shown in FIG. 3, has extending therefrom a driving capstan 11. Capstan 11 extends in a position to be engaged with the magnetic tape 12 when the magazine 1 is placed in position for recording. A similar playback motor 14 in console 6 is shown in FIG. 4, transporting tape 12 over the magnetic read heads, described hereafter, for reproduction of the recorded data. Motors 10 and 14 may be rotated in opposite directions to accomplish reversal of the direction of drive of the tape. Maintenance of proper tape tension and transport in either direction is accomplished in the gear box 59. Details of the gear box are described in the Grant and Mosher patent application on a "Slip Clutch Gear Box" referred to hereafter. The reversal of direction of the means for maintaining proper tape tension and assisting in the tape transport is effected by changing the relative speeds of the drive to the drag clutches in the hubs of the two reels.

*The systems with which the magazine is used*

A block diagram of the recording arrangement is shown in FIG. 3. Here 0–3 c.p.s. bandwidth analog signal inputs, including sine wave, square wave and direct current are shown as applied to the analog signal adapters 20. At the same time, on-off inputs are supplied at 21, and are applied along with the analog signals from the adapters 20, to the multiplexer switch indicated at 22.

From the multiplexer switch 22, sequentially sampled analog signals and the sequential on-off signal samples are supplied to the digitizer 24. The digitizer 24, which may conventionally comprise a timing generator, a synchronizer, a clock generator, a sweep generator and a signal comparator, supplies the resulting signals, together with the on-off and clock pulse signals, to the first set of recording heads 25 and the second set of recording heads 26, which are displaced transversely of the direction of travel of the tape, relative to the first set. At the same time, through the 7-bit binary counter circuitry 27, time parallel readout signals are applied through a recording amplifier 29 to the recording heads 25 and 26. Simultaneously, the audio input signals generally indicated at 30 are applied thereto through an audio signal amplifier 30A. When the tape 12 is traveling in its initial direction, all these signals are applied longitudinally of the tape 12 in transversely spaced channels by heads 25. When the tape 12 reaches the opposite end of its travel, relay circuitry, not shown but conventional in nature, shifts the inputs to the heads 26, which are displaced transversely of tape 12 by half the distance between adjacent ones of heads 25. At the same time, the relay circuitry operates through motor 10 to reverse the direction of travel of the tape 12, and additional data is recorded intermediate the channels first recorded. This, in the particular embodiment, enables recording continuously for an hour and ten minutes before it is necessary to change the magazine 1.

Figures 5, 6, 7:
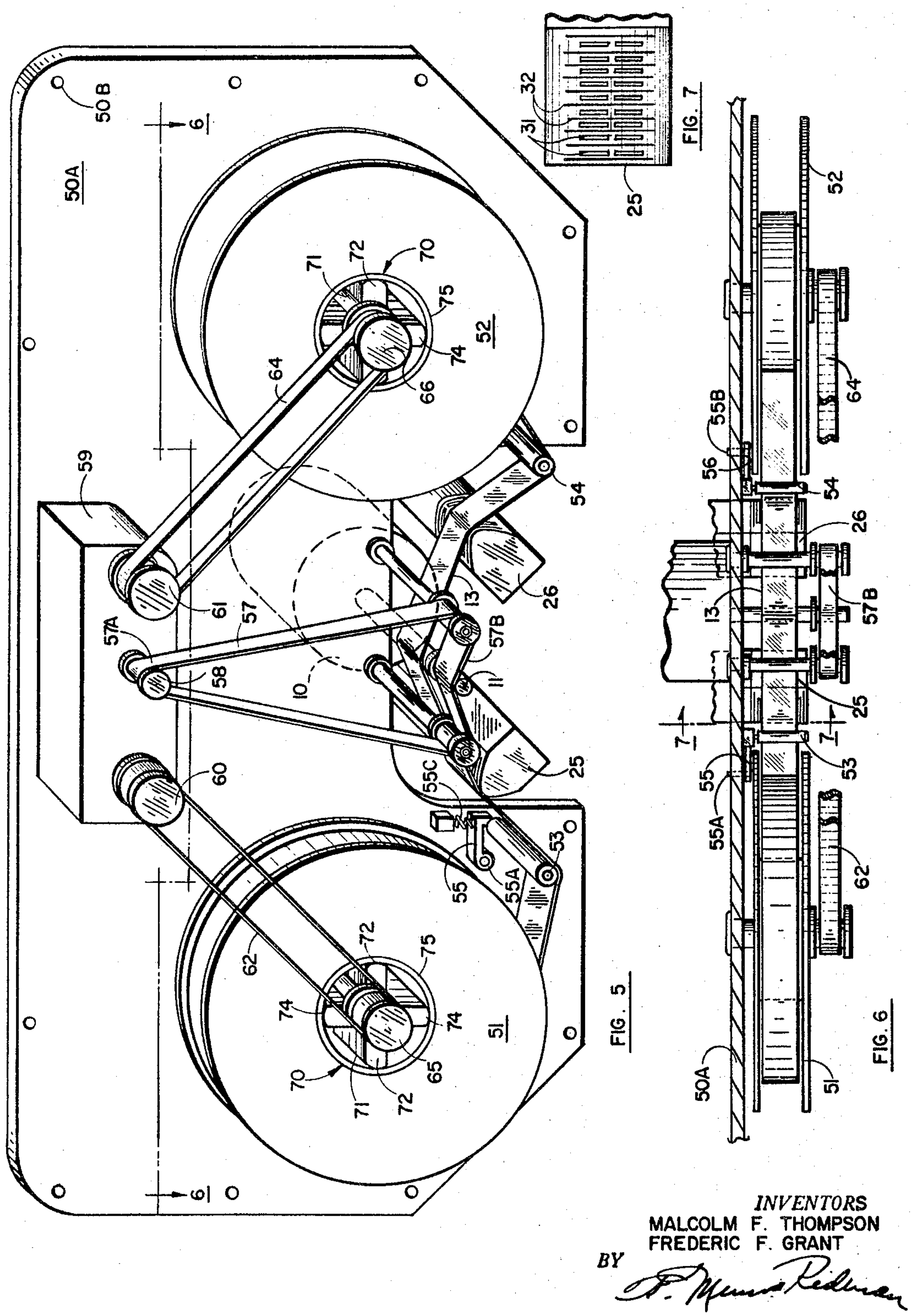
FIG. 5 is a perspective view, with the cover removed, of the tape drive magazine.
FIG. 6 is a top view, partially in section, taken as indicated by line 6—6 of FIG. 5 to show the relation of the parts in the magazine drive mechanism.
FIG. 7 is a fragmentary top view of one of the magnetic heads.

As may be seen in FIG. 5, and in greater detail in FIG. 7, each set of recording heads 25 or 26 consists of a plurality of individual magnetic heads 31 spaced transversely of the direction of tape travel, and separated by magnetic shields 32. Each head is energized by an individual winding, connected to conventional circuitry, not shown in detail in the drawings.

On the ground, the playback console 6 and display console 9 are used. The schematic block diagrams for these units have been shown in FIG. 4. Magazine 1 is connected in the console 6, which has the playback motor 14 and the magnetic read heads 35 and 36. Motor 14 drives tape 12, through the capstan 15, past the read heads 35 and 36. On the first pass, the data recorded on the first set of the longitudinal tape channels is read by the first set of the read heads 35. At the end of the tape travel, reversing means effective through suitable relays and the motors 14, details of which are not shown in the drawings, but are similar to those used in the recorder, are actuated. This operation connects the second set of the read heads 36 into the circuit so that the interlaced set of data may be read on the second pass.

The 7-bit digital signals and the on-off timing signals are applied to a decoder unit 37, which includes pulse forming amplifiers. A digital output, obtained through the amplifiers of the decoder unit 37, is applied to a 7-bit binary register 39, from which it passes to summing amplifiers 40. Amplifiers 40 deliver an analog signal output to signal adapter unit 41. The signal adapter unit 41 converts the analog voltages derived from decoder 37 into signals aceptable to the indicator control portion 42 of the armament control display equipment.

The circuit also utilizes the on-off signals from the decoder unit 37 to operate suitable relays for energizing indicator lights and establishing operating modes of the display equipment. These results are obtained by applying the on-off signals from decoder 38 to an electronic switch arrangement 44, which simultaneously receives timing pulses from decoder 37 through synchronizer circuitry 45. The electronic switch 44 then supplies on-off signal gates to an on-off signal register 46 and to the binary register 39.

From on-off register 46, signals are derived for the control of the on-off signal relays 47, which in turn apply on-off signals to the indicator control 42 of the radar indicator panel 8. At the same time, the recorded audio signals from tape 12 are applied to an audio amplifier 49, and reproduced by speaker 7 of the playback unit 6.

*Magazine construction*

The details of the construction of magazine 1 will next be considered, first in relation to the drive supplied through capstan 11 by the motor 10 in the airborne recorder 2, as shown in FIG. 3. The cooperating elements in the ground playback console 6 will then be discussed. These ground playback elements are substantially identical with the recording elements, acting similarly when the tape 12 is transported by the playback motor 14, as seen in FIG. 4, to reproduce the data recorded in the air. Power is obtained from a synchronous motor 14 operating from a ground A-C supply source, not shown, to drive a capstan 15 at exactly the same speed as that which was imparted to capstan 11 by motor 10 in the recorder 2 of FIG. 3. Motor 14 may be reversed in direction, for interlaced recording, as mentioned supra. In FIG. 5, the cover 50 has been removed for clarity, but would normally be secured to the cover backing plate 50A by means such as suitable conventional threaded fasteners, not shown, engaging with screw holes 50B.

Within magazine 1 are disposed a first reel 51 and a second reel 52, which serve alternately as supply and take-up reels when the direction of travel of tape 12 is reversed. In passing between reels 51 and 52, the tape 12 is drawn by capstan 11 during recording over the first and second sets of recording magnetic heads 25 and 26. During playback, the tape 12 is drawn over the first and second sets of playback or read heads 35 and 36 (FIG. 4) by capstan 15. The construction of read heads 35 and 36 is similar to that of the record heads 25 and 26.

The tape 12 is driven by the capstan 11 or 15 through friction. First and second guide rollers 53 and 54, mounted within the magazine 1 on resiliently held arms 55 and 56, are employed to hold the tape 12 against the capstan with sufficient force to ensure steady tape transport and proper contact with the record heads 25 and 26 or the playback heads 35 and 36. The rollers 53 and 54 must have sufficient freedom of movement, however, to permit ready insertion and removal of the magazine. This is provided by the resiliently held arms 55 and 56. Arms 55 and 56 are pivotally mounted on backing plate 50A at 55A and 55B, respectively, and are resiliently positioned by means such as springs 55C and 55D anchored to the plate 50A. Other equivalent means of securing proper frictional contact between the tape and the capstan might be employed.

The critical alinement between the axis of rotation of the capstan and the tape is insured by the same mounting stud arrangement as used in the recorder. This insures that the tape tension throughout its full width in the portion thereof adjacent and in contact with the capstan will be uniform. By so doing in this area of engagement, most satisfactory recording and playback quality may be obtained.

When inserting a magazine for either recording or playback, the portion of tape 12 between the magnetic heads will be pressed upwardly by, and continue to engage, the capstan. The capstan must extend into the magazine sufficiently to reach beyond the forward margin 13 of the tape 12, in order that a main reel drive belt 57 may be pressed thereagainst. The main reel drive belt 57 is looped at its upper end 57A about a main reel drive pulley 58, which is mounted in a power transmission box 59. Power is transmitted to power transmission box 59 by the engagement of the lower loop portion 57B of the belt 57 with the capstan 11 or 15.

First and second reel drive pulleys 60 and 61 extend out of transmission box 59, and transmit driving power through first and second reel drive belts 62 and 64 respectively, to pulleys 65 and 66 associated with the hubs of reels 51 and 52 respectively.

The output of power transmission box 59 provides a constant direction drive to each reel hub, by means which form no part of the instant invention, but the reel drive pulleys 60 and 61 always rotate in opposite directions. The speed of rotation of the take-up reel is higher than that of the supply reel. Which reel is acting in which capacity depends, of course, on the direction of tape transport. The direction of transport depends on the direction of rotation of the capstan. Tape tension during transport is controlled by the difference in speed between the two hubs, determined by the operation of power transmission box 59. The amount of tape on each reel is continuously changing during transport, and it will be appreciated that as the radius of the tape on each particular reel varies, so must the rate of rotation of that reel if there is to be a uniform tape transport speed over the recording and playback heads. Means are provided for retarding the delivery of the tape from the supply reel and for stepping up the rate at which the tape is drawn toward the take-up reel.

This is assisted in the instant embodiment by the operation of the power transmission or gear box 59, which forms no part of the present invention. Clutch means are disposed within the gear box to actuate driving gears, which will then transmit power through the individual driving means, as pulleys 60 and 61, to each reel. How this is accomplished by gear box 59 is described in the patent application of Frederic F. Grant and George E. Mosher entitled "Slip Clutch Gear Box," filed in the United States Patent Office, May 3, 1960, with Ser. No. 26,556, now Patent No. 3,084,880, and assigned to the assignee of the instant application.

The restraining action on the one of the reels 50 or 51 acting as a supply reel is produced by interposing magnetic drag clutches between the driven pulleys and the hub portions of the reels. By proper adjustment of the speed of the driven pulleys and the strength of the magnetic clutches, a substantially constant retarding restraint on the portion of tape 12 between the supply reel and the capstan may be imposed throughout the whole length of the reel travel. There will be a maximum speed difference when the particular reel is full, resulting in maximum drag. Similarly, the one of reels 50 or 51 acting as a take-up reel may be driven by gear box 59 through a corresponding magnetic drag clutch in its hub at a rate sufficiently greater than that produced by the capstan to provide a substantially constant tension in the tape between the capstan and the take-up reel.

Thus, any tendency on the part of tape on the supply reel to overrun the capstan drive, and to have periods of slackness as a result of minor irregularities in the driving speed, is eliminated. Similarly, by maintaining the tension in the tape between the capstan and the take-up reel, there will be no tendency for the tape to overrun the reel, regardless of the amount of tape which has been received thereon.

*The magnetic clutches*

The way in which the magnetic clutches may be used to accomplish these two effects may be seen by considering the nature of the force transmitted. Each of the clutches 70 consists of a rotor 71 having a plurality of alternating north poles 72 and south poles 74, surrounded by an eddy current ring 75. When rotor 71 turns, it sets up hysteresis or eddy currents in the ring 75. These currents cause a retarding force proportional to the difference in rotational speed between the rotor 71 and the ring 75, which is fixed to the reel 51 or 52.

When the radius of the tape wound on the supply reel is near its maximum, it will be obvious that, if there is uniform linear tape travel past the recording and playback heads, the rotational speed of the supply reel will be small compared to that which will be required as the radius reduces toward the end of the traverse. This will mean that there will be a varying difference between the speed of rotation of the magnetic clutch member driven from the gear box and the consequent rotation of the tape supply reel itself, and the amount of force required to restrain the supply reel from excess rotation will thus vary in accordance with the radius of the tape wound on the reels at any moment.

Similarly, the take-up reel will be required to reduce its rotational speed from relatively rapid at the beginning of the tape transport cycle, when the radius of the tape on the reel is relatively small, to a slower rate near the end of the cycle. This will be accomplished by similar cooperation with the magnetic clutch 70.

There has thus been provided a magazine construction which maintains constant tape tension with uniform tape transport speed, in a form which can be readily inserted in and removed from recording and playback equipment. The manufacture has been simplified by requiring precise location of only one point in relation to the rest of the magazine, that is, of the axis of rotation of the capstan.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In combination:

a mounting panel including a motor attached to said panel and a single capstan driven by said motor and extending from said panel;

a tape transport magazine adapted to be mounted to said panel so that said single capstan extends into said magazine, said magazine comprising, first and second reels adapted respectively to supply and to receive a tape, said tape passing over said single capstan, first and second magnetic drag clutches for imparting rotational motion respectively to said first and second reels, and power transmission means driven by said single capstan for rotating said first clutch in one direction and for rotating said second clutch in the opposite direction.

2. The combination defined in claim 1 wherein each of said clutches comprises;

a hub adapted to receive said reel, said hub comprising an eddy current ring, and a plurality of alternating north and south magnetic poles peripherally disposed about a shaft, said shaft being concentric with said hub and driven by said power transmission means, whereby rotation of said shaft imparts magnetic drag forces to said hub thereby providing a substantially constant retarding forces to said first reel and rotating said second reel at a rate appropriate to supply constant tension to said tape.

3. In combination;

a housing including a motor and a capstan driven by said motor and extending from said housing, a tape transport magazine adapted to be mounted on said housing so that said capstan extends into said magazine, said magazine comprising, first and second reels, adapted respectively to supply and to receive a tape, said tape adapted to engage said capstan, slip clutch gear means driven by a first pulley for rotating second and third pulleys respectively at different rates and in opposite directions, a first belt adapted to engage said capstan and said first pulley, thereby transmitting power from said motor to said slip clutch gear means, first and second shafts concentric respectively with said first and second reels, second and third belts connecting said second and third pulleys to respective ones of said first and second shafts, first and second hubs concentric respectively with said first and second shafts, said hubs adapted to receive said reels and having eddy current rings associated therewith, and first and second pluralities of alternating north and south magnetic poles peripherally attached to said shafts, to impart by magnetic force drag forces to said hubs, thereby providing a substantially constant retarding force to said first reel and rotating said second reel at a rate appropriate to supply constant tension to said tape.

References Cited

UNITED STATES PATENTS

| | | | |
|---|---|---|---|
| 2,661,162 | 12/1953 | Owens ___________ | 179—100.2 |
| 2,855,160 | 10/1958 | Fundingsland ______ | 242—55.14 |
| 2,951,914 | 9/1960 | Dubois ___________ | 179—100.2 |

BERNARD KONICK, *Primary Examiner.*

J. BREIMAYER, *Assistant Examiner.*